US012698219B2

(12) United States Patent (10) Patent No.: US 12,698,219 B2

Gilles (45) Date of Patent: Aug. 4, 2026

(54) SYSTEM AND METHOD FOR REMOVAL OF VOLATILE HYDROCARBONS FROM A WATER STREAM

(71) Applicant: ChartWater, LLC, Duluth, GA (US)

(72) Inventor: Gregory C. Gilles, Suwanee, GA (US)

(73) Assignee: ChartWater, LLC, Duluth, GA (US)

( * ) Notice: Subject to any disclaimer, the term of this patent is extended or adjusted under 35 U.S.C. 154(b) by 729 days.

(21) Appl. No.: 18/161,127

(22) Filed: Jan. 30, 2023

(65) Prior Publication Data

US 2023/0242417 A1 Aug. 3, 2023

Related U.S. Application Data

(60) Provisional application No. 63/305,730, filed on Feb. 2, 2022.

(51) Int. Cl.

| | |
|---|---|
| *C02F 1/20* | (2023.01) |
| *B01F 23/23* | (2022.01) |
| *B01F 23/237* | (2022.01) |
| *B01F 25/313* | (2022.01) |
| *C02F 1/74* | (2023.01) |
| *B01F 23/20* | (2022.01) |
| *C02F 101/32* | (2006.01) |
| *C02F 103/06* | (2006.01) |

(52) U.S. Cl.

CPC ................ *C02F 1/20* (2013.01); *B01F 23/23* (2022.01); *B01F 23/23761* (2022.01); *B01F 25/31331* (2022.01); *C02F 1/74* (2013.01); *B01F 23/29* (2022.01); *C02F 2101/322*

(2013.01); *C02F 2103/06* (2013.01); *C02F 2201/005* (2013.01); *C02F 2301/08* (2013.01)

(58) Field of Classification Search

None

See application file for complete search history.

(56) References Cited

U.S. PATENT DOCUMENTS

| | | | | | |
|---|---|---|---|---|---|
| 5,389,267 | A | * | 2/1995 | Gorelick ............ | B01D 17/0205 210/170.07 |
| 6,321,837 | B1 | * | 11/2001 | Doering ................. | B09C 1/085 166/279 |

(Continued)

OTHER PUBLICATIONS

International Search Report and Written Opinion for International Application PCT/US2023/061417 Dated May 30, 2023.

*Primary Examiner* — Clare M Perrin

(74) *Attorney, Agent, or Firm* — Edell, Shapiro & Finann, LLC

(57) ABSTRACT

A system for separating a volatile hydrocarbon from a water stream includes a lead mixer-injector device that receives an untreated water stream including a volatile hydrocarbon, injects compressed air into the untreated water stream and mixes the injected air with the untreated water stream to form a first injected fluid stream. A shear mixing device receives the first injected fluid stream from the mixer-injector device and shear gas bubbles within the received first injected fluid stream so that a frothed stream is formed. A lead degas separator receives and separates the frothed stream from the shear mixing device into a volatile hydrocarbon stream and a partially treated water stream based on difference in density. A compressor directs clean and oil free compressed air to the lead mixer-injector device.

14 Claims, 4 Drawing Sheets

(56) References Cited

U.S. PATENT DOCUMENTS

| | | | |
|---|---|---|---|
| 6,730,214 B2 * | 5/2004 | Mazzei | B01D 19/0068 |
| | | | 96/208 |
| 2003/0066647 A1 * | 4/2003 | Abouodah | B09C 1/002 |
| | | | 166/265 |
| 2009/0050549 A1 * | 2/2009 | Kerfoot | B09C 1/08 |
| | | | 210/170.07 |
| 2011/0168640 A1 | 7/2011 | Gilmour et al. | |
| 2020/0094201 A1 * | 3/2020 | Ruybal | C02F 1/20 |

* cited by examiner

SYSTEM AND METHOD FOR REMOVAL OF VOLATILE HYDROCARBONS FROM A WATER STREAM

CLAIM OF PRIORITY

This application claims the benefit of U.S. Provisional Application No. 63/305,730, filed Feb. 2, 2022, the contents of which are hereby incorporated by reference.

FIELD OF THE DISCLOSURE

The present disclosure relates generally to systems and methods for purification of water and, more particularly, to a system and method for removing volatile hydrocarbons from water.

BACKGROUND OF THE INVENTION

Dissolved gases, including methane and other volatile hydrocarbons, may render ground water retrieved from wells undrinkable due to aesthetics, poor taste or health concerns. In addition, at elevated concentrations, methane and other dissolved volatile hydrocarbons can escape quickly from water causing an explosive hazard in poorly ventilated or confined areas. Systems and methods for removing methane and other volatile hydrocarbons from water are desirable.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a system for separating a volatile hydrocarbon from a water stream includes a lead mixer-injector device that receives an untreated water stream including a volatile hydrocarbon, injects compressed air into the pressurized untreated water stream and mixes the injected air with the untreated water stream to form a first injected fluid stream. Air is injected using diffusers. A shear mixing device receives the first injected fluid stream from the mixer-injector device and shears gas bubbles within the received first injected fluid stream so that a frothed stream is formed. A lead degas separator receives and separates the frothed stream from the shear mixing device into a volatile hydrocarbon stream and a partially treated water stream based on difference in density. A compressor directs compressed air to the lead mixer-injector device.

In another aspect, a process for separating a volatile hydrocarbon from a water stream includes the steps of injecting compressed air into a pressurized and untreated water stream, mixing the compressed air and untreated water stream to form a first injected fluid stream, shearing gas bubbles within the first injected fluid stream so that a frothed stream is formed and separating the frothed stream into a volatile hydrocarbon stream and a partially treated water stream based on difference in density.

DETAILED DESCRIPTION OF EMBODIMENTS

Figure 1:
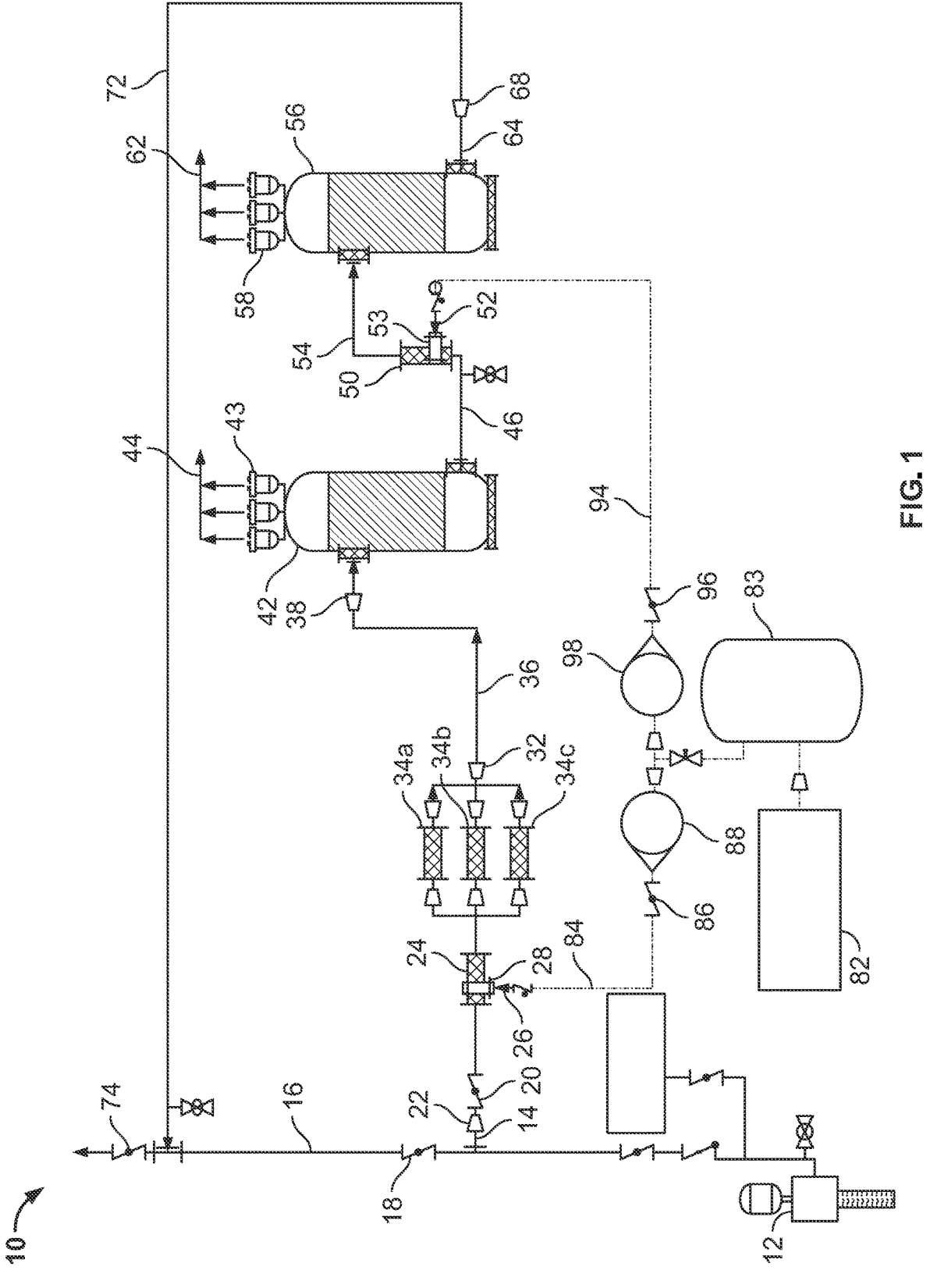
FIG. 1 is a piping and flow diagram in an embodiment of the system and method of the disclosure.

While the disclosure below references processing water streams at wellheads, and a system that may be retrofitted to prior wellheads, the system and method of the disclosure may be used further downstream or at other stages of water processing.

It should be noted herein that the lines, conduits, piping, passages and similar structures and the corresponding streams are sometimes both referred to by the same element number set out in the figures.

Reference numerals that are introduced in the specification in association with a drawing figure may be repeated in one or more subsequent figures for shared elements or components without additional description in the specification in order to provide context for other features.

In the claims, letters are used to identify claimed steps (e.g., a., b. and c.). These letters are used to aid in referring to the method steps and are not intended to indicate the order in which the claimed steps are performed, unless and only to the extent that such order is specifically recited in the claims.

A first embodiment of the system of disclosure is indicated in general at 10 in FIG. 1. A pump 12 is positioned at a wellhead and provides a pressurized stream of untreated ground or well water to a split that forms line 14 and 16. Line 16 is a system bypass line through which unprocessed ground or well water can be directed when a corresponding isolation valve 18 is open and an isolation valve 20 in line 14 is closed. In normal operation of the system of the disclosure, valve 20 is open and valve 18 is closed.

The stream of ground or well water contains dissolved methane or natural gas and potentially entrained methane or natural gas as well as other volatile hydrocarbons (including, but not limited to, ethane and propane or other volatile hydrocarbons) that may be dissolved or entrained.

After entering line 14, water from pump 12 travels through reducer 22 whereby the diameter of the piping decreases so that the water flow velocity increases to promote downstream mixing. As an example only, reducer 22 may reduce the diameter of the line from ten inches to eight inches. The water stream then enters a lead mixer-injector device 24 which, as an example only and described in greater detail below, may include a static mixer.

In the lead mixer-injector device 24, the water stream passes into a static inline mixer having blades or other mixing structures and an injector port whereby a stream of compressed air 26 is injected into the liquid water and mixed so that small air bubbles are formed in the liquid water. As examples only, the mixer-injector may be the devices disclosed in U.S. Pat. No. 4,123,800 or U.S. Pat. No. 5,863,128, both to Mazzei, the contents of both of which are hereby incorporated by reference.

The lead mixer-injector device 24 which, as an example only, may be a static in-line mixer, brings the water and air in close contact by introducing small bubbles of air into the water. The resulting turbulence provides an air scrubbing or stripping process which physically removes dissolved gases from solution whereby bubbles of methane are formed in the water.

The efficiency of the scrubbing or stripping process depends at least in part on the amount of surface contact between air and water, which is controlled primarily by the size of the air bubbles (with smaller bubbles providing greater efficiency), water velocity, and in-situ mixing time. The mixer-injector device 24 therefore is provided with a diffuser, indicated at 28 in FIG. 1, which may include a structure covering the flow path of the air and featuring a number of small openings/pores or a mesh. As a result, smaller air bubbles are formed within the liquid water stream.

Figure 6:
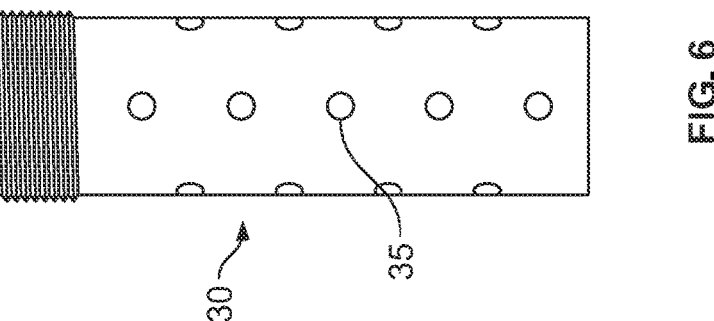
FIG. 6 is an enlarged side elevational view of an embodiment of the solution tube of the diffuser of FIG. 5.
Figure 4:
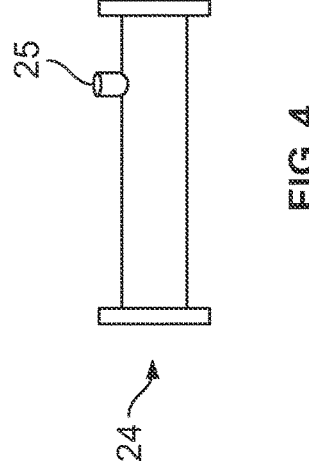
FIG. 4 is a side elevational view of an embodiment of the injector-mixer device of the system of FIGS. 1-3.
Figure 5:
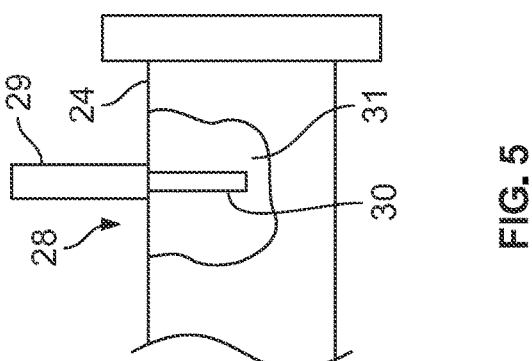
FIG. 5 is partial cutaway view side elevational view of an embodiment of the diffuser of the system of FIGS. 1-3 installed within the injector-mixer of FIG. 4.

An example of a suitable injector-mixer device is indicated in general at 24 in FIG. 4. The mixer-injector device 24 includes an injection port 25 which, as illustrated in FIG. 5, receives the diffuser 28. With continued reference to FIG. 5, the diffuser 28 includes a valve body 29 secured to the mixer-injector device 24 and a solution tube 30, which extends into the fluid pathway 31 of the mixer-injector. The valve body 29 and solution tube 30 receive the stream of compressed air 26 illustrated in FIG. 1. As illustrated in FIG. 6, the solution tube includes a closed bottom 33 and a number of openings 35. The stream of air 26 is injected through the openings 35 into the water stream flowing through the mixer-injector device. As examples only, the mixer-injector device 24 may be an SMP series in-line static mixer available from Storm Mixer (www.stormmix.com) and the diffuser 28 may be the Model 5721 diffuser available from Inyo Process (www.inyoprocess.com).

The injected fluid travels from the lead mixer-injector device 24 through a shear mixing device, such as flash reactors 34a-34c. While three flash reactors are illustrated, the system may include one or another different number of flash reactors. Each flash reactor includes a mixing chamber with structures that promote re-direction and shearing of the entering gas and liquid water mixture. This creates a foam or froth so that mass transfer is encouraged with the methane as it froths out of the water for downstream separation. As an example only, a suitable shear mixing device is the reactor disclosed in U.S. Pat. No. 6,730,214 to Mazzei, the contents of which are hereby incorporated by reference.

The frothed stream exiting the flash reactors 34a-34d then optionally travels through an expander 32 whereby the diameter of the piping increases. As an example only, the expander may expand the diameter of the piping from eight inches to ten inches. The frothed stream then travels through line 36 to an optional reducer 38 where, as an example only, the piping diameter is reduced from ten inches to eight inches. The frothed stream exiting the reducer 38 then enters a lead degas separator 42, which is provided with a lead degas relief valve 43. The removed gases exit via the relief valves 43 to the atmosphere 44.

Within the lead degas separator 42, methane is separated from the entering frothed stream and exits the column as overhead stream 44 through the lead degas relief valve 43. The degas relief valve allow air to escape while water is retained within the separator 42. The lead degas separator separates entrained and stripped methane (and other volatile hydrocarbons if present) from the water based on the density difference between the gas and liquid. Overhead stream 44 may be pure methane or a gas containing a high concentration of methane and is transferred to the air phase through the degas relief valve. A partially treated water liquid stream 46 exits the bottom of the lead degas separator 42.

As examples only, the lead degas separator 42 may include the technology disclosed in U.S. Pat. No. 6,866,703 to Mazzei, U.S. Pat. No. 5,622,545 to Mazzei et al. and/or U.S. Pat. No. 5,338,341 to Mazzei et al., the contents of each of which are hereby incorporated by reference. In such degas separators, the stream exiting reducer 37 enters the top of the degas separator 42 tangentially, which causes it to spin. The spinning water flows down through the degas separator 42 and is discharged at the bottom as liquid stream 46. The methane (and possibly other volatile hydrocarbon) gases collect at the vortex where they pass through a collector and flow out through the top of the degas separator 42 through a degas relief valve 43.

The partially treated water liquid stream 46, which may still contain some methane or other volatile hydrocarbons, flows into a lag mixer-injector device 50, which may feature a construction and operation similar to lead mixer-injector device 24.

As in the lead mixer-injector device 24, in lag mixer-injector device 50, the water stream passes into a second inline mixer and diffuser combination having mixers and an injector port whereby a stream of compressed air 52 is injected into the liquid water and mixed so that small air bubbles are formed in the liquid water. As explained previously, given the propensity of methane and other VOC compounds to favor the air phase over the water phase, the resulting turbulence causes bubbles of methane to form in the water due to air scrubbing. As in the lead mixer-injector device 24, the lag mixer-injector device 50 is provided with a diffuser 53, including a structure covering the flow path of the fluid and featuring a number or small openings/pores or a mesh.

After leaving the lag mixer-injector device 50, the mixed phase fluid stream 54 enters a lead degas separator 56, which is provided with a lag degas relief valve 58. Lag mixer-injector device 50 and lag degas relief valve 58 both feature constructions and operations similar to those of lead degas separator 56 and lead degas relief valve 43.

As in the lead degas separator 42, in the lag degas separator 56, methane is separated from the stream 54 and exits the column as overhead stream 62 through the lag degas relief valve 58. A treated water liquid stream 64 exits the bottom of the lag degas separator 56.

A throttling valve may optionally be provided to reduce the pressure of stream 64 prior to the stream entering an expander 68 whereby the diameter of the piping increases. As an example only, the expander may expand the diameter of the piping from eight inches to ten inches. Treated water stream 72 exits the expander 68 and the system through valve 74.

While the embodiment of FIG. 1 illustrates lead and lag mixer-injector devices and lead and lag degas separators, alternative embodiments of the system of the disclosure may include one of each component or more than two of each component.

Compressed air streams 26 and 52, which are clean and oil free and filtered before use, are provided to lead mixer-injector device 24 and lag mixer-injector device 50 by a compressor 82. Compressed air from compressor and air receiver tank combination and appropriate oil coalescing filters 82 travels through air line 84, through throttling valve 86 and rotameter 88 to form stream 26. Compressed air from compressor 82 similarly travels through air line 94, through throttling valve 96 and rotameter 98 to form stream 52.

The compressor 82 is designed to work in an automated mode and deliver air at the pressure and flow needed on demand. Adjustable air rotameters 88 and 98 measure air flow in cubic feet per minute (CFM). As examples only, the compressor may be capable of a 200-300 CFM flow rate at 100 psi.

The compressor 82 may optionally be provided with a storage tank 83 (for example, 240 gallons), coalescing oil filters, or oil/water separators (not shown), to manage drain line wastewater and/or help minimize cycling of the compressor and to save energy.

Figure 2:
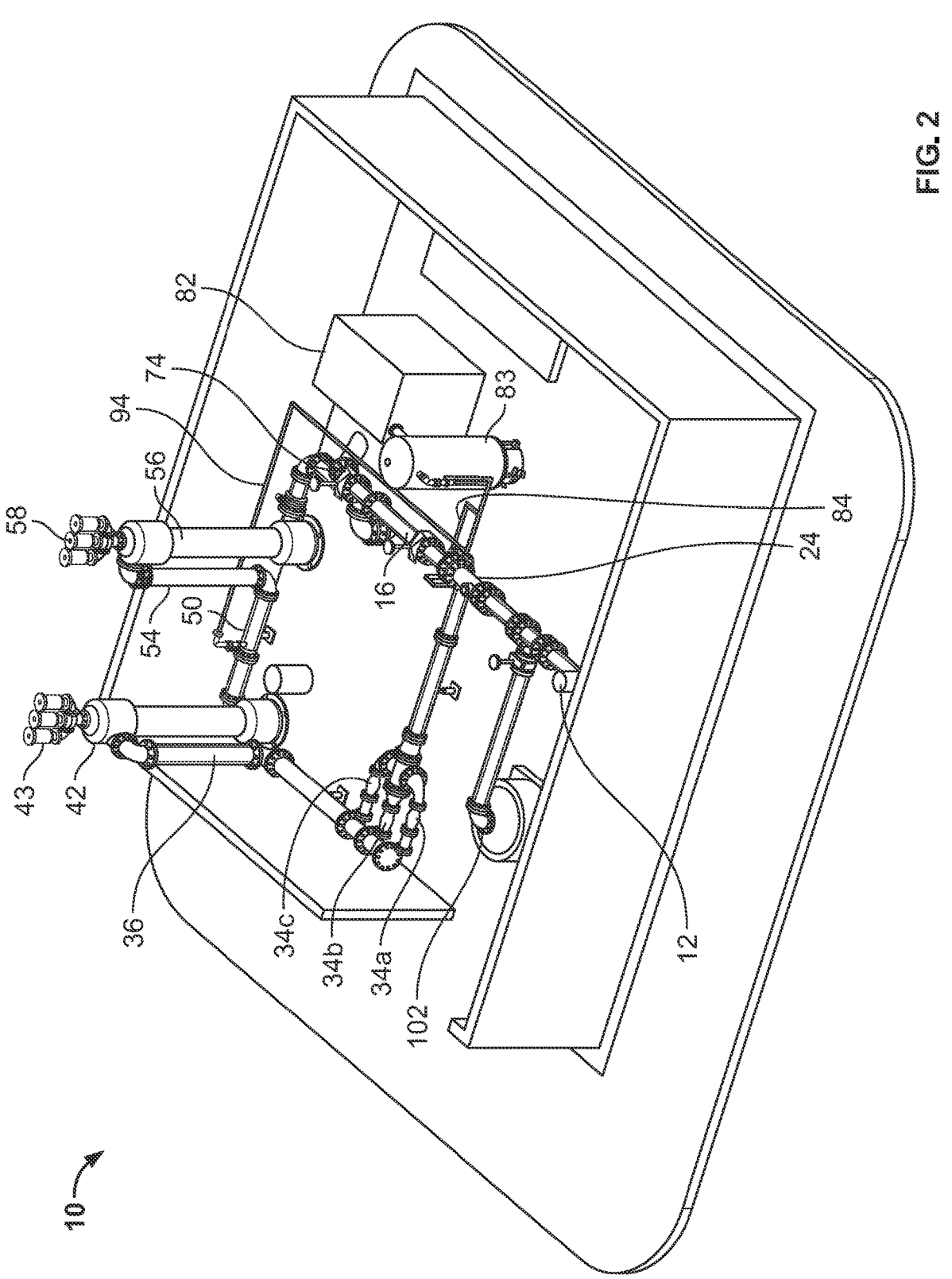
FIG. 2 is a perspective view of an embodiment of the system of FIG. 1.
Figure 3:
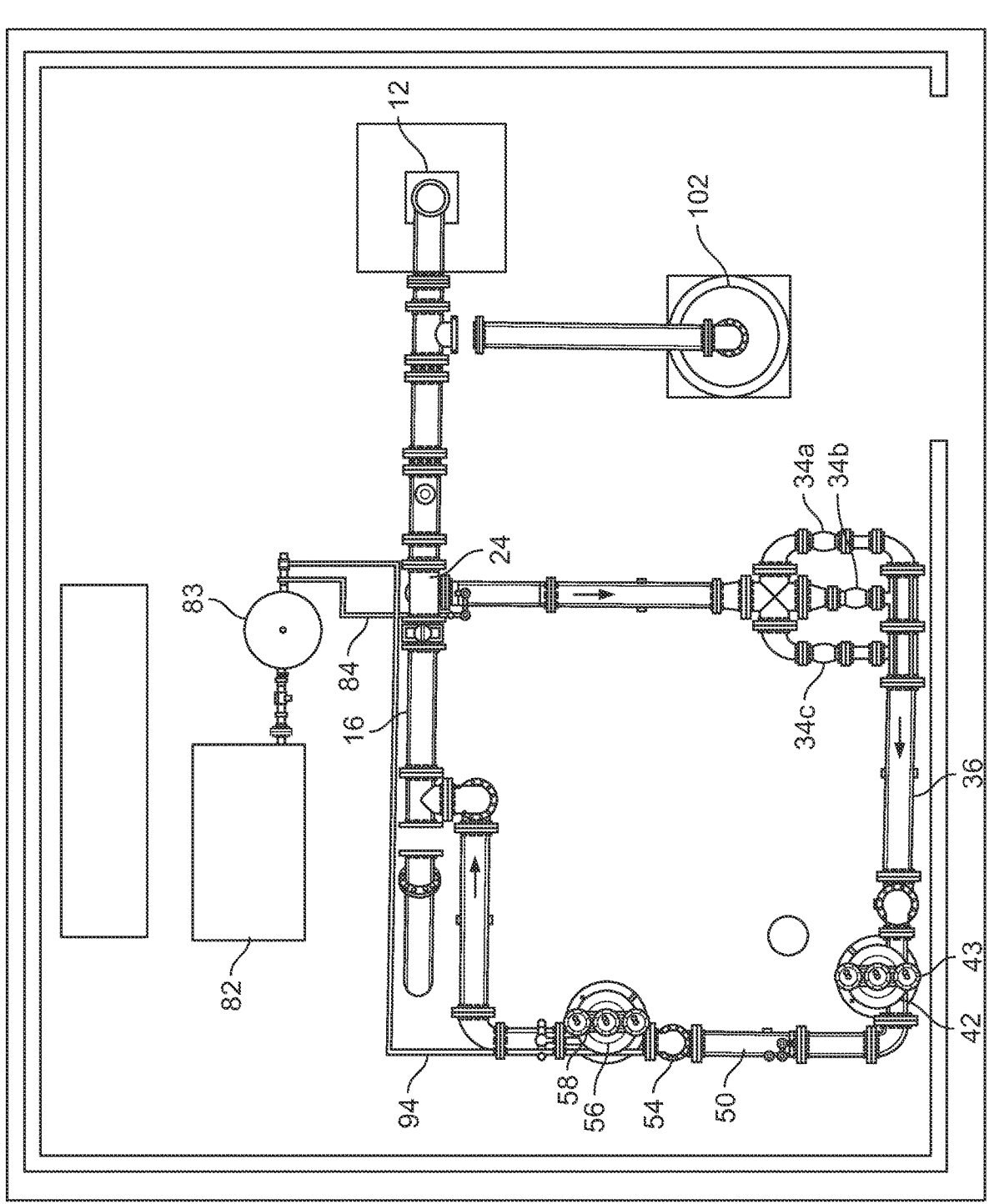
FIG. 3 is a plan view of the system of FIG. 2.

Perspective and plan views of an example equipment layout of the system of FIG. 1 are presented in FIGS. 2 and 3, respectively, where common reference numbers are used. FIGS. 2 and 3 also illustrate a wet well 102 that water may be directed to from the pump 12 upon pump startup.

Test results for the system of FIGS. 1-3 at flow rates of 280-300 gallons per minute (gpm) of water for degas remediation at various Air to Water ratios provided by each of the lead and lag mixer-injector devices 24 and 50 are presented in Table 1 below. In Table 1, "Raw Methane" is the methane content of the raw untreated water in micrograms/liter (ug/L) while "Treated Methane" is the methane content of the treated water in micrograms/liter (ug/L). In addition, the diffusers of the lead and lag mixer-injector devices 24 and 50 each provide 10 psi of backpressure.

TABLE 1

| Methane Removal at Varying Air to Water Ratios with Diffuser 10 psi Backpressures | | | | |
| --- | --- | --- | --- | --- |
| Raw Methane (ug/L) | 7000 | 7000 | 7000 | 6400 |
| Treated Methane (ug/L) | 53 | 40 | 29 | 31 |
| % Removal | 99.2 | 99.4 | 99.6 | 99.5 |
| Air:Water Ratio (per injector) | 0.80 | 1.00 | 1.25 | 1.50 |

Test results for the system of FIGS. 1-3 at flow rates of 280-300 gpm of water for degas remediation at various Air to Water ratios for each of the lead and lag mixer-injector devices with the diffusers of the lead and lag mixer-injector devices 24 and 50 providing varying backpressure are presented below in Table 2.

TABLE 2

| Methane Removal at Varying Air to Water Ratios and Backpressures | | | | |
| --- | --- | --- | --- | --- |
| Lead diffuser backpressure (psi) | 10 | 10 | 10 | 10 |
| Lag diffuser backpressure (psi) | 0 | 0 | 20 | 20 |
| Raw Methane (ug/L) | 7000 | 7000 | 7000 | 6400 |
| Treated Methane (ug/L) | 53 | 40 | 29 | 31 |
| % Removal | 99.2 | 99.4 | 99.6 | 99.5 |
| Air:Water Ratio (per injector) | 0.80 | 1.00 | 1.25 | 1.50 |

As shown in the above tables, the preferred Air to Water ratio provided by each of the lead and lag mixer-injector devices 24 and 50 is in the range of 0.80 to 1.50.

Embodiments of the disclosure remove both entrained and dissolved methane, and other volatile hydrocarbons from water with no significant changes were noted in the non-methane water quality parameters for the treated water stream.

Furthermore, embodiments of the disclosure provide inline processes that do not "break" the head pressure of untreated water streams. Embodiments of the disclosure also do not feature outlets with treated water streams exiting at atmospheric pressure. Such embodiments are in contrast to conventional air stripping systems and processes and thus may be used while keeping pressure in a "closed" system. This reduces energy and equipment costs.

While the preferred embodiments of the invention have been shown and described, it will be apparent to those skilled in the art that changes and modifications may be made therein without departing from the spirit of the invention.

What is claimed is:

1. A system for separating a volatile hydrocarbon from a water stream comprising:

a lead mixer-injector device configured to receive an untreated water stream including a volatile hydrocarbon, inject compressed air into the untreated water stream and mix the injected air with the untreated water stream to form a first injected fluid stream;

a shear mixing device configured to receive the first injected fluid stream from the lead mixer-injector device and shear gas bubbles within the first injected fluid stream so that a frothed stream is formed;

a lead degas separator configured to receive and separate the frothed stream from the shear mixing device into a volatile hydrocarbon stream and a partially treated water stream based on difference in density;

a compressor configured to direct clean and oil free compressed air to the lead mixer-injector device;

a lag mixer-injector device configured to receive second compressed air and the partially treated water stream from the lead degas separator including a remaining volatile hydrocarbon, inject the second compressed air into the partially treated water stream and mix the second injected air with the partially treated water stream to form a second injected fluid stream; and a lag degas separator configured to receive and separate the second injected fluid stream from the lag mixer-injector device into a second volatile hydrocarbon stream and a treated water stream based on a difference in density.

2. The system of claim 1 wherein the lead mixer-injector device and the lag mixer-injector device each has a diffuser including a plurality of openings or a mesh.

3. The system of claim 1 further comprising a first line reducer positioned upstream of the lead mixer-injector device, a first line expander positioned downstream of the lead mixer-injector device, a second line reducer positioned upstream of the lead degas separator and a second line expander positioned downstream of the lag degas separator.

4. The system of claim 1 wherein the lead degas separator includes a lead degas relief valve configured to open when a pressure of a volatile hydrocarbon within the lead degas separator is raised and the lag degas separator includes a lag degas relief valve configured to open when a pressure of a volatile hydrocarbon within the lag degas separator rises above a pre-determined level.

5. The system of claim 1 wherein the lag mixer-injector device receives the second compressed air from the compressor.

6. The system of claim 1 wherein the lead degas separator includes a lead degas relief valve configured to open when a pressure of a volatile hydrocarbon within the lead degas separator is raised.

7. The system of claim 1 wherein the lead mixer-injector device includes a diffuser having a plurality of openings or a mesh.

8. The system of claim 1 wherein the shear mixing device includes a plurality of flash reactors.

9. The system of claim 1 further comprising a line reducer positioned upstream of the lead mixer-injector device and a line expander positioned downstream of the lead mixer-injector device.

10. The system of claim 1 further comprising a throttling valve downstream from the lead degas separator.

11. A method for separating a volatile hydrocarbon from a water stream comprising:

pumping an untreated water stream from a pump positioned at a wellhead;

injecting compressed air into the untreated water stream;

mixing the injected air and the untreated water stream to form a first injected fluid stream;

shearing gas bubbles within the first injected fluid stream so that a frothed stream is formed;

separating the frothed stream into a volatile hydrocarbon stream and a partially treated water stream based on a difference in density;

injecting second compressed air into the partially treated water stream;

mixing the second injected compressed air and the partially treated water stream to form a second injected fluid stream; and separating the second injected fluid stream into a volatile hydrocarbon stream and a treated water stream based on a difference in density.

12. The method of claim 11 where the volatile hydrocarbon includes methane.

13. The method of claim 11 further comprising throttling the partially treated water stream.

14. The method of claim 11 wherein a ratio of the injected air to untreated water during the injecting is in a range of 0.80 to 1.50.

* * * * *